(12) United States Patent
Hu et al.

(10) Patent No.: US 11,777,346 B2
(45) Date of Patent: Oct. 3, 2023

(54) ROTOR ASSEMBLY AND MOTOR

(71) Applicant: Gree Electric Appliances, Inc. of Zhuhai, Guangdong (CN)

(72) Inventors: Yusheng Hu, Guangdong (CN); Bin Chen, Guangdong (CN); Jinfei Shi, Guangdong (CN); Yong Xiao, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 355 days.

(21) Appl. No.: 17/054,818

(22) PCT Filed: Dec. 13, 2018

(86) PCT No.: PCT/CN2018/120892
§ 371 (c)(1),
(2) Date: Nov. 12, 2020

(87) PCT Pub. No.: WO2020/015287
PCT Pub. Date: Jan. 23, 2020

(65) Prior Publication Data
US 2021/0218298 A1 Jul. 15, 2021

(30) Foreign Application Priority Data
Jul. 20, 2018 (CN) .......................... 201810805393.1

(51) Int. Cl.
*H02K 1/24* (2006.01)
*H02K 1/32* (2006.01)

(52) U.S. Cl.
CPC ................. *H02K 1/24* (2013.01); *H02K 1/32* (2013.01); *H02K 2213/03* (2013.01)

(58) Field of Classification Search
CPC ........ H02K 1/32; H02K 19/103; H02K 1/246; H02K 1/24; H02K 17/16; H02K 2213/03; H02K 19/14
(Continued)

(56) References Cited

U.S. PATENT DOCUMENTS 5,801,478 A * 9/1998 Nashiki .................. H02K 1/246
310/216.107
5,903,080 A * 5/1999 Nashiki .................. H02K 29/03
310/168

(Continued)

FOREIGN PATENT DOCUMENTS

CN 1255925 C 5/2006
CN 102047531 A 5/2011
(Continued)

*Primary Examiner* — Alex W Mok
(74) *Attorney, Agent, or Firm* — The Webb Law Firm (57) ABSTRACT

The present disclosure provides a rotor assembly and a motor. The rotor assembly includes a rotor body; the rotor body includes a plurality of magnetic poles centered on an axis of the rotor body and uniformly arranged along a circumferential direction of the rotor body; each of the magnetic poles includes a filling slot provided therein with a conductive and magnetic isolation material, the filling slots of the plurality of magnetic poles are orderly arranged along the circumferential direction of the rotor body; two ends of each of the filling slots along the circumferential direction of the rotor body have a first sidewall and a second sidewall respectively; the first sidewall of each of the filling slots and the second sidewall of the adjacent filling slot are parallel to each other, and together form a magnetic flux channel parallel to the q-axis.

16 Claims, 4 Drawing Sheets

(58) Field of Classification Search
USPC .................................................... 310/261.1
See application file for complete search history.

(56) References Cited

U.S. PATENT DOCUMENTS

| | | | | | |
|---|---|---|---|---|---|
| 6,121,706 | A * | 9/2000 | Nashiki | ............... | H02K 1/246 310/216.106 |
| 6,900,571 | B2 * | 5/2005 | Yoshino | ............... | H02K 19/14 310/264 |
| 7,102,259 | B2 * | 9/2006 | Kawaguchi | ............... | H02K 1/246 310/60 A |
| 7,112,908 | B2 * | 9/2006 | Takita | ............... | H02K 1/246 310/156.56 |
| 7,405,504 | B2 * | 7/2008 | Arimitsu | ............... | H02K 1/2766 310/156.56 |
| 7,598,645 | B2 * | 10/2009 | Ley | ............... | H02K 1/2766 310/156.56 |
| 7,816,822 | B2 * | 10/2010 | Nashiki | ............... | H02K 1/2773 310/257 |
| 8,405,272 | B2 * | 3/2013 | Kikuchi | ............... | H02K 21/46 310/156.83 |
| 8,912,700 | B2 * | 12/2014 | Iki | ............... | H02K 1/246 310/156.53 |
| 8,917,004 | B2 * | 12/2014 | Kalev | ............... | H02K 19/10 310/112 |
| 9,490,673 | B2 * | 11/2016 | Okubo | ............... | H02K 21/14 |
| 9,712,006 | B2 * | 7/2017 | Kondou | ............... | H02K 1/2766 |
| 2003/0090170 | A1 | 5/2003 | Yoshino et al. | | |
| 2003/0173861 | A1 * | 9/2003 | Kawaguchi | ............... | H02K 15/0012 310/61 |
| 2006/0108888 | A1 | 5/2006 | Jung et al. | | |
| 2007/0152527 | A1 * | 7/2007 | Yura | ............... | H02K 1/246 310/156.53 |
| 2008/0278021 | A1 * | 11/2008 | Ley | ............... | H02K 1/2766 310/156.53 |
| 2010/0187935 | A1 | 7/2010 | Nam et al. | | |
| 2011/0012464 | A1 | 1/2011 | Lee et al. | | |
| 2014/0021820 | A1 * | 1/2014 | Kondou | ............... | H02K 1/276 310/156.53 |
| 2017/0222505 | A1 | 8/2017 | Janjic et al. | | |
| 2017/0302117 | A1 * | 10/2017 | Fukumoto | ............... | H02K 1/16 |
| 2018/0226848 | A1 * | 8/2018 | Kolehmainen | ............... | H02K 19/14 |
| 2019/0238035 | A1 | 8/2019 | Matsumoto et al. | | |

FOREIGN PATENT DOCUMENTS

| | | | | |
|---|---|---|---|---|
| CN | 108011459 | A | | 5/2018 |
| CN | 108768015 | A | | 11/2018 |
| CN | 208596974 | U | | 3/2019 |
| GB | 1305069 | | | 1/1973 |
| JP | 2001231230 | A | | 8/2001 |
| JP | 2003259615 | A | | 9/2003 |
| JP | 2004056936 | A | | 2/2004 |
| JP | 2017527247 | A | | 9/2017 |
| JP | 2018068090 | A | | 4/2018 |
| WO | WO-2018074561 | A1 * | 4/2018 | ............. H02K 17/16 |
| WO | 2018083639 | A1 | | 5/2018 |

* cited by examiner

ROTOR ASSEMBLY AND MOTOR

CROSS-REFERENCE TO RELATED APPLICATIONS

This application is the United States national phase of International Application No. PCT/CN2018/120892 filed Dec. 13, 2018, and claims priority to Chinese Patent Application No. 201810805393.1 filed Jul. 20, 2018, the disclosures of which are hereby incorporated by reference in their entirety.

BACKGROUND OF THE INVENTION

Field of the Invention

The present disclosure relates to the technical field of motors, and particularly, to a rotor assembly and a motor.

Description of Related Art

A direct-start synchronous reluctance motor combines the structural characteristics of an induction motor and a synchronous reluctance motor, wherein a start is realized by a torque generated by a squirrel-cage induction, and a reluctance torque is generated by a rotor inductance difference to realize a constant speed operation, so that the direct-start synchronous reluctance motor can start and operate by being directly connected to a power supply. Compared with a direct-start permanent magnet motor, the direct-start synchronous reluctance motor does not use any rare earth permanent magnet material and has no demagnetization problem, so that it has a low cost and a high reliability. Compared with an asynchronous motor, the direct-start synchronous reluctance motor has a high efficiency and a constant rotation speed.

The traditional synchronous reluctance motor requires a driver for the start and operation control, which leads to a high cost and a difficult control. In addition, the driver causes a part of loss, which reduces the efficiency of the entire motor system.

A cheap and easy-to-start synchronous induction motor, and a manufacturing device and a manufacturing method of the synchronous induction motor is known to the inventors Hayato Yoshino, Hitoshi Kawaguchi, and Yoshio Takita. At least a pair of slit portions forming a two-pole magnetic polar projection having an easy-to-pass direction of a magnetic flux, i.e., q-axis and a difficult-to-pass direction of a magnetic flux, i.e., d-axis which are orthogonal and a plurality of slot portions arranged at a peripheral side of the slit portions, the slit portions and the slot portion are filled with conductivity materials therein. The slit portions are in a linear shape, and the slot portions are arranged radially at equal intervals in a circumferential direction.

However, in this patent, since the slot portions are arranged radially at equal intervals, the magnetic flux between the slot portions flows radially in a direction perpendicular to the surface of the rotor, and the slot portions block the flow of the magnetic flux along the q-axis, and particularly, as the slot portions are closer to the d-axis, the resistance to the magnetic flux along the q-axis becomes more obvious, while the magnetic flux flows more smoothly along the d-axis. Thus, a difference between the magnetic flux along the d-axis and the q-axis is not obvious, and a saliency ratio is not large, resulting in low output power and efficiency.

SUMMARY OF THE INVENTION

The present disclosure provides a rotor assembly including a rotor body;

the rotor body includes a plurality of magnetic poles centered on an axis of the rotor body and uniformly arranged along a circumferential direction of the rotor body;

each of the magnetic poles includes a filling slot provided therein with a conductive and magnetic isolation material, and the filling slots of the plurality of magnetic poles are orderly arranged along the circumferential direction of the rotor body; two ends of each of the filling slots along the circumferential direction of the rotor body have a first sidewall and a second sidewall respectively; the first sidewall of each of the filling slots and the second sidewall of the adjacent filling slot are parallel to each other, and together form a magnetic flux channel parallel to q-axis.

In some embodiments, there is a distance between the filling slot and an outer peripheral wall of the rotor body.

In some embodiments, the magnetic pole further includes a slit slot separated from the filling slot, and the filling slot includes a first filling slot;

on a cross-section perpendicular to an axis of the rotor body, in the same magnetic pole, the slit slot and the first filling slot are arranged along the d-axis of the rotor body, and the slit slot is located between the first filling slot and the axis of the rotor body.

In some embodiments, on the cross-section perpendicular to the axis of the rotor body, the first filling slot and the slit slot are both axisymmetric shapes with the d-axis as a symmetry axis.

In some embodiments, in each of the magnetic poles, there are at least two slit slots arranged at intervals along the d-axis.

In some embodiments, along the d-axis, a distance between the first filling slot and the adjacent slit slot is smaller than a distance between the adjacent slit slots.

In some embodiments, in each of the magnetic poles, there are at least three slit slots, and distances between the adjacent slit slots decrease successively in a direction away from the axis of the rotor body.

In some embodiments, the filling slot includes second filling slots;

the number of the second filling slots is twice the number of the slit slots; on the cross-section perpendicular to the axis of the rotor body, two filling slots are respectively provided at two ends of each of the slit slots and are symmetrical to each other with the d-axis as a symmetry axis.

In some embodiments, in each of the magnetic poles, a distance between the first filling slot and the adjacent second filling slot along the circumferential direction of the rotor body is smaller than a distance between adjacent two of the second filling slots.

In some embodiments, in each of the magnetic poles, there are at least three slit slots, and distances between the adjacent slit slots decrease successively in a direction away from the axis of the rotor body;

distances between adjacent two of the second filling slots increase successively in a direction away from the first filling slot.

In some embodiments, in the same magnetic pole, areas of the second filling slots on the cross-section perpendicular to the axis of the rotor body increase successively in a direction away from the first filling slot.

In some embodiments, in the same magnetic pole, lengths of the second filling slots extending from an outer peripheral wall of the rotor body toward the slit slot increase successively in a direction away from the first filling slot.

In some embodiments, on the cross-section perpendicular to the axis of the rotor body, lines respectively connecting two ends of the first filling slot along the circumferential direction of the rotor body with a center of rotor body form an angle α, and 0.05τ≤α≤0.3τ, wherein τ=180°/p, and p is the number of pole pairs.

In some embodiments, 0.15τ≤α≤0.26τ.

In some embodiments, on the cross-section perpendicular to the axis of the rotor body, the slit slot is extended along a straight line or an arc line.

In some embodiments, the rotor assembly further includes a conductive ring;

the conductive ring is fixedly connected to an axial end of the rotor body and attached onto the conductive and magnetic isolation material provided in the filling slot, and the conductive and magnetic isolation materials in all of the filling slots are conducted through the conductive ring.

In some embodiments, a material of the conductive ring is the same as the conductive and magnetic isolation materials provided in the filling slots.

In some embodiments, a magnetic isolation material is provided in the slit slot.

In some embodiments, the conductive ring has a heat dissipation hole;

the slit slot is located in the heat dissipation hole on a projection along the axis of the rotor body.

In some embodiments, an outer profile of the conductive ring is cylindrical, and/or a shape of the heat dissipation hole is cylindrical.

Another aspect of the present disclosure provides a motor, including any of the rotor assemblies aforementioned.

In some embodiments, the motor further includes a stator;

the stator has a mounting hole; the rotor body of the rotor assembly is disposed to pass through and coaxial with the mounting hole, and a distance between an outer wall of the rotor body and an inner wall of the mounting hole is H along a radial direction of the rotor body;

on the rotor body, two ends of each of the slit slots are respectively provided with one filling slot, a minimum distance from the slit slot to the second filling slots corresponding to the two ends thereof is L, and H≤L≤2H.

The rotor assembly provided by the present disclosure adopts the technical solution in which the first sidewall of the filling slot and the second sidewall of the adjacent filling slot are parallel to each other and together form a magnetic flux channel parallel to the q-axis. Therefore, the design is reasonable and the cost is low, the magnetic flux along the q-axis can be smoother, and a difference between the magnetic flux along d-axis and q-axis can be more obvious, thereby improving the output power and efficiency.

BRIEF DESCRIPTION OF THE DRAWINGS

The accompanying drawings described here are used to provide further understanding of the present disclosure and constitute a part of the present disclosure. The exemplary embodiments of the present disclosure and the descriptions thereof are used to explain the present disclosure, rather than being improper limitations of the present disclosure. In which.

DETAILED DESCRIPTION OF THE INVENTION

In order for the objectives, technical solutions and advantages of the present disclosure to be clearer, the technical solutions of the present disclosure will be clearly and completely described in conjunction with the specific embodiments of the present disclosure and corresponding accompanying drawings. It is apparent that those described are only a part, rather than all, of the embodiments of the present disclosure. Based on the embodiments in the present disclosure, any other embodiment obtained by persons of ordinary skill in the art without creative work should fall within the protection scope of the present disclosure.

It should be noted that the terms 'first', 'second', etc. in the specification and claims of the present disclosure and the above accompanying drawings are used to distinguish similar objects, and not necessarily to describe a specific order or sequence. It should be understood that the order numbers used in this way can be interchanged under appropriate circumstances so that the embodiments of the present disclosure described here can be implemented in an order other than those illustrated or described here.

Figure 1:
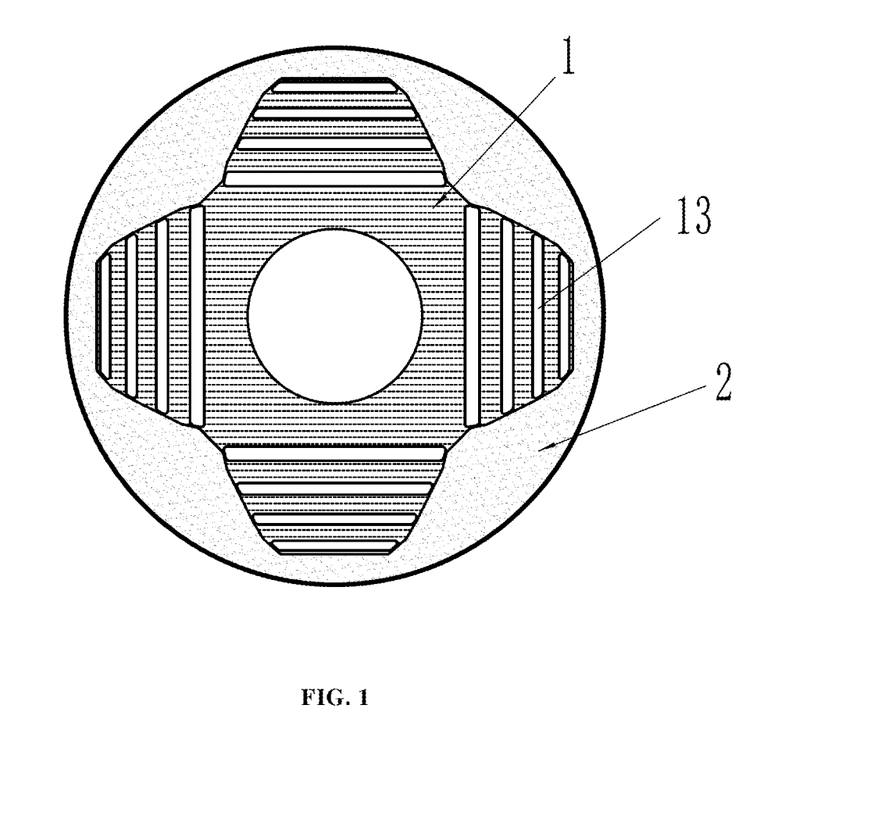
FIG. 1 is a schematic structural view of an embodiment of a rotor assembly of the present disclosure.
Figure 2:
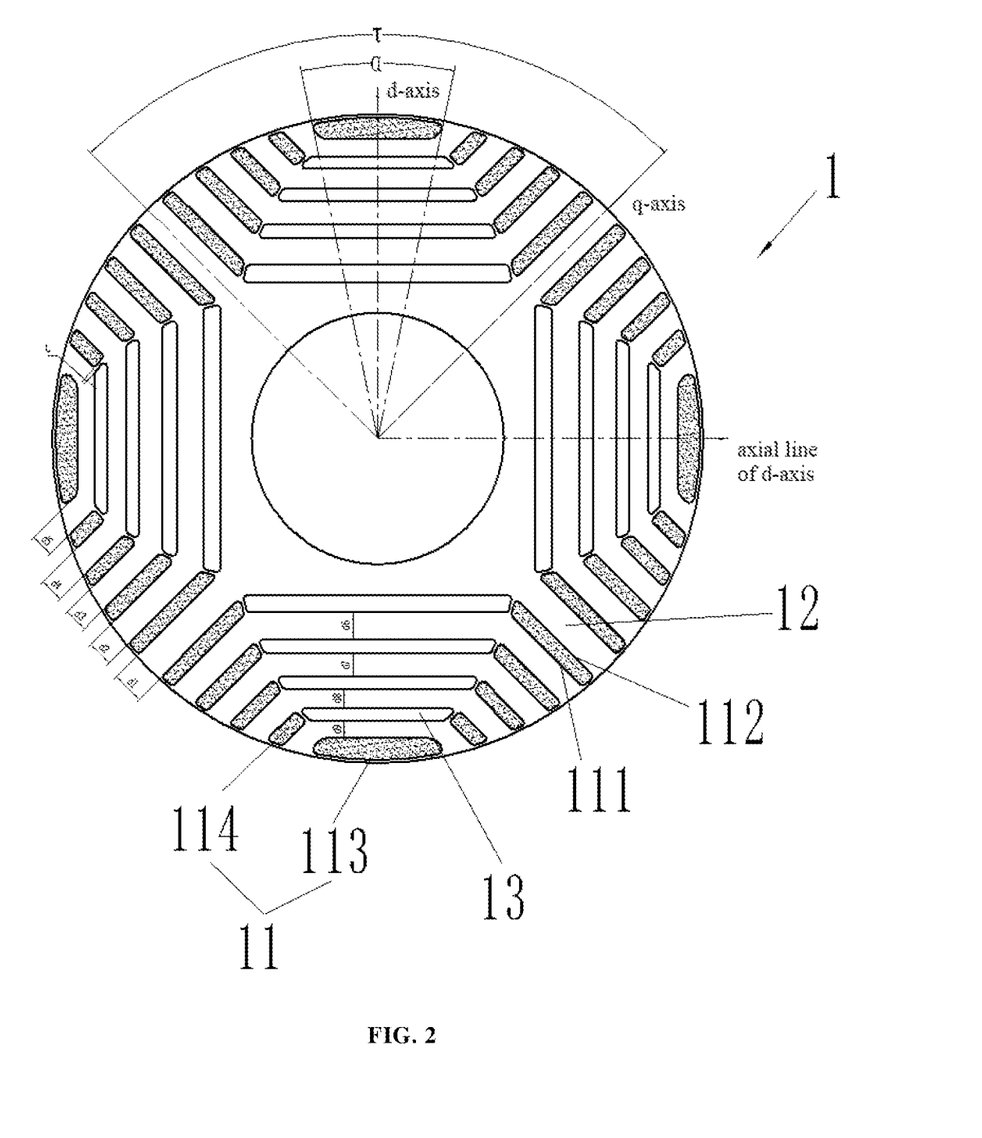
FIG. 2 is a schematic view of an end face of a first form of a rotor body in FIG. 1.
Figure 3:
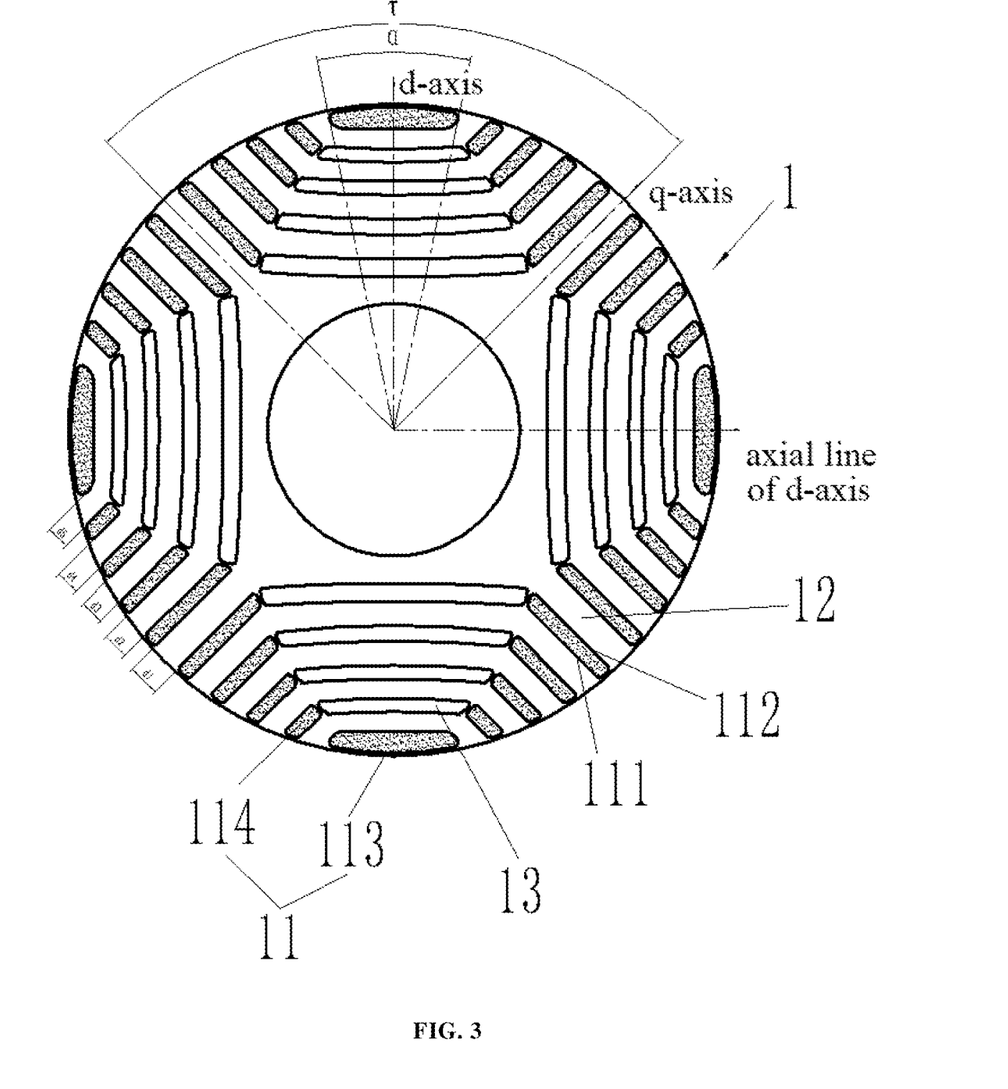
FIG. 3 is a schematic view of an end face of a second form of a rotor body in FIG. 1.

FIGS. 1, 2 and 3 illustrate a rotor assembly, including a rotor body 1.

The rotor body 1 includes a plurality of magnetic poles (not illustrated) centered on an axis of a rotor and uniformly arranged along a circumferential direction of the rotor body 1; each of the magnetic poles includes a filling slot 11 provided therein with a conductive and magnetic isolation material (not illustrated), wherein the conductive and magnetic isolation material may be aluminum or aluminum alloy, but is not limited thereto. The filling slots 11 of the plurality of magnetic poles are orderly arranged along the circumferential direction of the rotor body 1; two ends of each of the filling slots 11 along the circumferential direction of the rotor body 1 have a first sidewall 111 and a second sidewall 112 respectively; the first sidewall 111 of each of the filling slots 11 is parallel to the second sidewall 112 of the adjacent filling slot 11, and the first sidewall 111 of each of the filling slots 11 and the second sidewall 112 of the adjacent filling slot 11 together form a magnetic flux channel 12 parallel to q-axis. By adopting such a technical solution, the design is reasonable and the cost is low, and compared with the prior art, the magnetic flux along the q-axis can be smoother, and a difference between the magnetic flux along d-axis and q-axis can be more obvious, thereby improving the output power and efficiency.

In actual manufacturing, there is a distance between the filling slot 11 and an outer peripheral wall of the rotor body 1, so that when the conductive and magnetic isolation material is filled into the filling slot 11, the conductive and magnetic isolation material will not protrude from the outer peripheral wall of the rotor body 1, i.e., when the filling of the conductive and magnetic isolation material is finished, the outer peripheral wall of the rotor body 1 does not need to be processed, thereby reducing the manufacturing cost.

Further, as illustrated in FIGS. 1, 2 and 3, the magnetic pole further includes a slit slot 13 separated from the filling slot 11, and the filling slot 11 includes a first filling slot 113. On a cross-section perpendicular to an axis of the rotor body 1, in the same magnetic pole, the slit slot 13 and the first filling slot 113 are arranged along the d-axis of the rotor body 1, and the slit slot 13 is located between the first filling slot 113 and the axis of the rotor body 1. In this way, air circulates in the slit slot 13 so that the rotor body 1 can dissipate heat through the slit slot 13. In which, as illustrated in FIG. 2, on the cross-section perpendicular to the axis of the rotor body 1, the slit slot 13 is extended along a straight line, or as illustrated in FIG. 3, the slit slot 13 is extended along an arc line.

In some embodiments, as illustrated in FIGS. 2 and 3, on the cross-section perpendicular to the axis of the rotor body 1, the first filling slot 113 and the slit slot 13 are both axisymmetric shapes with the d-axis as a symmetry axis. In this way, a magnetic barrier layer for blocking the magnetic flux along the d-axis can be formed between the first filling slot 113 and the slit slot 13, to further increase the magnetic resistance along the d-axis and decrease the magnetic flux along the d-axis, thereby making the difference between the magnetic flux along the d-axis and the q-axis be more obvious, and further improving the efficiency of the motor. In actual manufacturing, as illustrated in FIGS. 2 and 3, on the cross-section perpendicular to the axis of the rotor body 1, lines respectively connecting two ends of the first filling slot 113 along the circumferential direction of the rotor body 1 with a center of rotor body 1 form an angle α, and $0.05\tau \leq \alpha \leq 0.3\tau$, in some embodiments $0.15\tau \leq \alpha \leq 0.26\tau$, wherein $\tau = 180°/p$, and p is the number of pole pairs. This can avoid the problem that the angle α formed by the first filling slot 113 is too large and causes an asynchronous torque to be small and a starting capability of the motor to be deteriorated.

Further, as illustrated in FIGS. 2 and 3, in each of the magnetic poles, there are at least two slit slots 13 arranged at intervals along the d-axis. In this way, a magnetic barrier layer for blocking the magnetic flux along the d-axis can also be formed between adjacent slit slots 13, so as to further increase the magnetic resistance along the d-axis and decrease the magnetic flux along the d-axis.

In actual manufacturing, the slit slot 13 is extended along a straight line on the cross-section perpendicular to the axis of the rotor body 1, along the d-axis, a distance between the first filling slot 113 and the adjacent slit slot 13 is smaller than a distance between the adjacent slit slots 13. Further, in each of the magnetic poles, there are at least three slit slots 13, and the distances between the adjacent slit slots 13 decrease successively in a direction along the d-axis and away from the axis of the rotor body 1, i.e., $d6 > d7 > d8 > d9$, as illustrated in FIG. 2. In this way, the width of the magnetic flux channel can correspond to the magnetic channel formed between the filling slots 11, so that more magnetic flux can flow smoothly along the q-axis to increase the inductance of the q-axis and improve the motor output and efficiency.

In an implementation manner, as illustrated in FIGS. 2 and 3, the filling slot 11 includes second filling slots 114, the number of which is twice the number of the slit slots 13. On the cross-section perpendicular to the axis of the rotor body 1, two ends of each of the slit slots 13 are respectively provided with one filling slot 114, two filling slot 114 provided two ends of each of the slit slots 13 are symmetrical to each other with the d-axis as a symmetry axis.

In actual manufacturing, in each of the magnetic poles, the distance between the first filling slot 113 and the adjacent second filling slot 114 along the circumferential direction of the rotor body 1 is smaller than the distance between adjacent two of the second filling slots 114. Further, when there are at least three slit slots 13 in each of the magnetic poles, the distances between adjacent two of the second filling slots 114 increase successively in a direction along the circumference of the rotor body 1 and away from the first filling slot 113. That is, as illustrated in FIGS. 2 and 3, the widths of the magnetic flux channel 12 formed between adjacent two of the filling slots decrease gradually in a direction away from the q-axis, i.e., $d1 > d2 > d3 > d4 > d5$. Since the magnetic flux along the q-axis is influenced more as the magnetic flux channel 12 is closer to the q-axis, the width of the magnetic flux channel 12 close to the q-axis is designed to be wider to allow more magnetic flux to flow in, while avoiding a magnetic flux saturation, so as to use the magnetic flux more effectively, increase the inductance along the q-axis, and improve the motor output and efficiency.

Meanwhile, in the same magnetic pole, areas of the second filling slots 114 on the cross-section perpendicular to the axis of the rotor body 1 increase successively in a direction along the circumference of the rotor body 1 and away from the first filling slot 113. That is, as the second filling slot 114 is closer to the corresponding q-axis, a length extending towards the q-axis increases, and the area of the second filling slot 114 increases. Conversely, as the second filling slot 114 is farther from the corresponding q-axis axis, the length extending towards the q-axis decreases, and the area of the second filling slot 114 decreases. The deep and narrow second filling slot 114 has a skin effect, which helps to improve the start performance of the motor. In the same magnetic pole, lengths of the second filling slots 114 extending from the outer peripheral wall of the rotor body 1 toward the slit slots 13 increase successively in a direction away from the first filling slot 113.

In an implementation manner, as illustrated in FIG. 1, a conductive ring 2 is further included to be fixedly connected to an axial end of the rotor body 1 and attached onto the conductive and magnetic isolation material provided in the filling slot 11. The conductive and magnetic isolation materials in all of the filling slots 11 can be conducted through the conductive ring 2, so that the conductive and magnetic isolation materials in all of the filling slots 11 can form a squirrel-cage to achieve an asynchronous start.

In some embodiments, the material of the conductive ring 2 is the same as the conductive and magnetic isolation materials provided in the filling slots 11. At this time, a magnetic isolation material (which may be a non-conductive material) is provided in the slit slot 13 to prevent the material on the conductive ring 2 from falling off and entering the slit slot 13.

Figure 4:
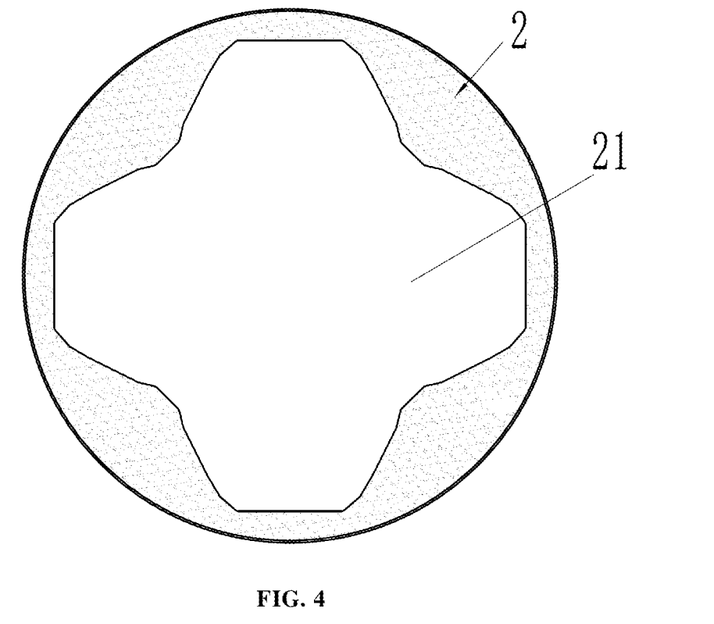
FIG. 4 is a schematic diagram of a conductive ring in FIGS. 1.

In an implementation manner, as illustrated in FIG. 4, the conductive ring 2 has a heat dissipation hole 21, and the slit slot 13 is located in the heat dissipation hole 21 on a projection along the axis of the rotor body 1. This can prevent the conductive ring 2 from covering the slit slot 13, thereby ensuring the heat dissipation effect. In actual manufacturing, an outer profile of the conductive ring 2 may be cylindrical, but is not limited thereto, and a shape of the heat dissipation hole 21 may be cylindrical, but is not limited thereto.

In order to achieve the objective of the present disclosure, another aspect of the present disclosure provides a motor including the rotor assembly described in the above embodiments.

Figure 5:
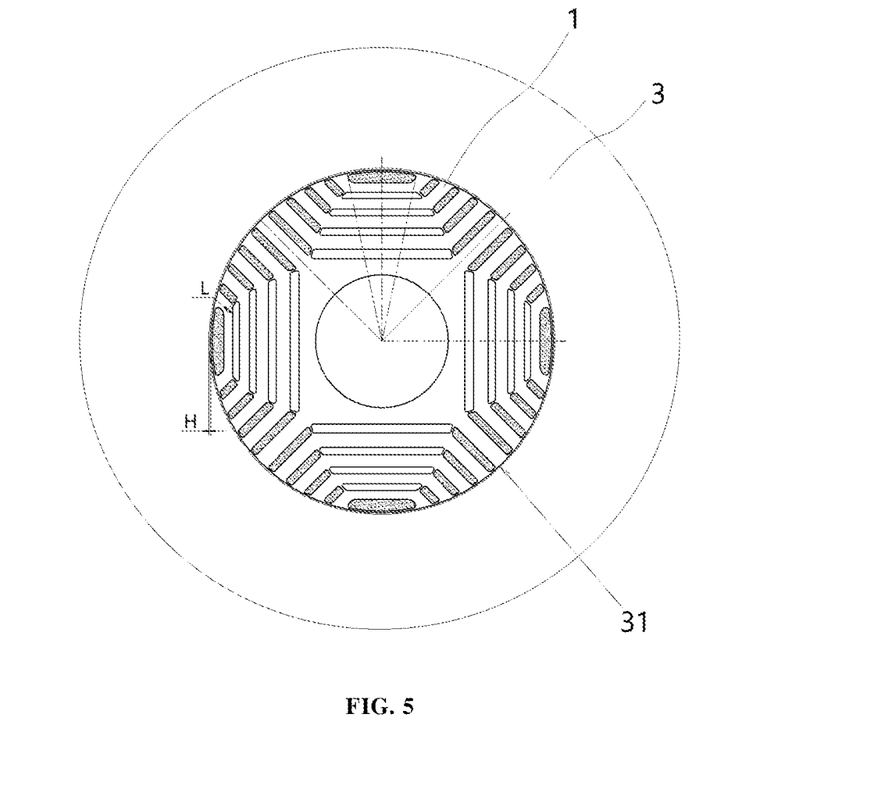
FIG. 5 is a schematic view, on the cross-section perpendicular to the axis of the rotor body, of composite structure including a rotor assembly and a stator of an embodiment of the present disclosure.

In some embodiments, as illustrated in FIG. 5, the motor further includes a stator 3. The stator 3 has a mounting hole 31. The rotor body 1 of the rotor assembly is disposed to pass through and coaxial with the mounting hole 31, and a distance between an outer wall of the rotor body 1 and an inner wall of the mounting hole 31 is H along the radial direction of the rotor body 1. Referring to FIGS. 2 and 5, on the rotor body 1, when two ends of each of the slit slots 13 are respectively provided with one filling slot 114, a minimum distance from the slit slot 13 to the second filling slots 114 corresponding to the two ends thereof is L, and H≤L≤2H.

The above embodiments make the present disclosure have the advantages that the design is reasonable and the cost is low, the magnetic flux along the q-axis can be smoother, and a difference between the magnetic flux along d-axis and q-axis can be more obvious, thereby improving the output power and efficiency.

Those described above are merely embodiments of the present disclosure, rather than limitations to the present disclosure. Various modifications and changes can be made to the present disclosure by persons skilled in the art. Any modification, equivalent replacement, improvement, etc. made within the spirit and principle of the present disclosure should fall within the scope of the claims of the present disclosure.

The invention claimed is:

1. A rotor assembly, comprising a rotor body, wherein
the rotor body comprises a plurality of magnetic poles centered on an axis of the rotor body and uniformly arranged along a circumferential direction of the rotor body;
each of the magnetic poles comprises a filling slot provided therein with a conductive and magnetic isolation material, and the filling slots of the plurality of magnetic poles are orderly arranged along the circumferential direction of the rotor body; two ends of each of the filling slots along the circumferential direction of the rotor body have a first sidewall and a second sidewall respectively; the first sidewall of each of the filling slots and the second sidewall of an adjacent filling slot are parallel to each other, and together form a magnetic flux channel parallel to a q-axis;
the magnetic pole further comprises a slit slot separated from the filling slot, and the filling slot comprises a first filling slot;
on a cross-section perpendicular to an axis of the rotor body, in the same magnetic pole, the slit slot and the first filling slot are arranged along a d-axis of the rotor body, and the slit slot is located between the first filling slot and the axis of the rotor body;
on the cross-section perpendicular to the axis of the rotor body, the first filling slot and the slit slot are both axisymmetric shapes with the d-axis as a symmetry axis;
the filling slot comprises second filling slots;
the number of the second filling slots is twice the number of the slit slots; on the cross-section perpendicular to the axis of the rotor body, two filling slots are respectively provided at two ends of each of the slit slots and are symmetrical to each other with the d-axis as a symmetry axis; and
in each of the magnetic poles, a distance between the first filling slot and the adjacent second filling slot along the circumferential direction of the rotor body is smaller than a distance between an adjacent two of the second filling slots.

2. The rotor assembly according to claim 1, wherein there is a distance between the filling slot and an outer peripheral wall of the rotor body.

3. The rotor assembly according to claim 1, wherein in each of the magnetic poles, there are at least two slit slots arranged at a plurality of intervals along the d-axis.

4. The rotor assembly according to claim 3, wherein along the d-axis, a distance between the first filling slot and the adjacent slit slot is smaller than a distance between adjacent slit slots.

5. The rotor assembly according to claim 4, wherein in each of the magnetic poles, there are at least three slit slots, and distances between the adjacent slit slots decrease successively in a direction away from the axis of the rotor body.

6. The rotor assembly according to claim 1, wherein
in each of the magnetic poles, there are at least three slit slots, and distances between the adjacent slit slots decrease successively in a direction away from the axis of the rotor body; and
distances between the adjacent two of the second filling slots increase successively in a direction away from the first filling slot.

7. The rotor assembly according to claim 1, wherein in the same magnetic pole, a plurality of areas of the second filling slots on the cross-section perpendicular to the axis of the rotor body increase successively in a direction away from the first filling slot.

8. The rotor assembly according to claim 1, wherein in the same magnetic pole, a plurality of lengths of the second filling slots extending from the outer peripheral wall of the rotor body toward the slit slot increase successively in a direction away from the first filling slot.

9. The rotor assembly according to claim 1, wherein on the cross-section perpendicular to the axis of the rotor body, a plurality of lines respectively connecting two ends of the first filling slot along the circumferential direction of the rotor body with a center of the rotor body form an angle denoted by $\alpha$, and $0.05\tau < \alpha < 0.3\tau$, wherein $\tau = 180°/p$, and p is the number of pole pairs.

10. The rotor assembly according to claim 9, wherein $0.15\tau < \alpha < 0.26\tau$.

11. The rotor assembly according to claim 1, wherein on the cross-section perpendicular to the axis of the rotor body, the slit slot is extended along a straight line or an arc line.

12. The rotor assembly according to claim 1, wherein
the rotor assembly further comprises a conductive ring; and
the conductive ring is fixedly connected to an axial end of the rotor body and attached onto the conductive and magnetic isolation material provided in the filling slot, and the conductive and magnetic isolation materials in all of the filling slots are conducted through the conductive ring.

13. The rotor assembly according to claim 12, wherein a magnetic isolation material is provided in the slit slot.

14. The rotor assembly according to claim 13, wherein
the conductive ring has a heat dissipation hole; and
the slit slot is located in the heat dissipation hole on a projection along the axis of the rotor body.

15. A motor, comprising the rotor assembly according to claim 1.

16. The motor according to claim 15, wherein
the motor further comprises a stator;
the stator has a mounting hole; the rotor body of the rotor assembly is disposed to pass through and coaxial with the mounting hole, and the distance between the outer wall of the rotor body and an inner wall of the mounting hole along a radial direction of the rotor body is denoted by H; and on the rotor body, two ends of each of the slit slots are respectively provided with one filling slot, a minimum distance from the slit slot to the second filling slots corresponding to the two ends thereof is denoted by L, and $H<L<2H$.

* * * * *

UNITED STATES PATENT AND TRADEMARK OFFICE
CERTIFICATE OF CORRECTION

PATENT NO. : 11,777,346 B2
APPLICATION NO. : 17/054818
DATED : October 3, 2023
INVENTOR(S) : Yusheng Hu et al.

It is certified that error appears in the above-identified patent and that said Letters Patent is hereby corrected as shown below:

In the Claims

Column 8, Line 39, Claim 9, delete "$0.05\tau<\alpha<0.3\tau$," and insert --$0.05\tau\leq\alpha\leq0.3\tau$,--

Column 8, Line 42, Claim 10, delete "$0.15\tau<\alpha<0.26\tau$." and insert --$0.15\tau\leq\alpha\leq0.26\tau$.--

Column 9, Line 8, Claim 16, delete "$H<L<2H$." and insert --"$H\leq L\leq 2H$."--

Signed and Sealed this
Nineteenth Day of December, 2023

Katherine Kelly Vidal
*Director of the United States Patent and Trademark Office*